March 17, 1953 R. O. RAGAN ET AL 2,631,491
METHOD OF MEASURING AREAS, ESPECIALLY IRREGULAR AREAS
Filed Oct. 17, 1947
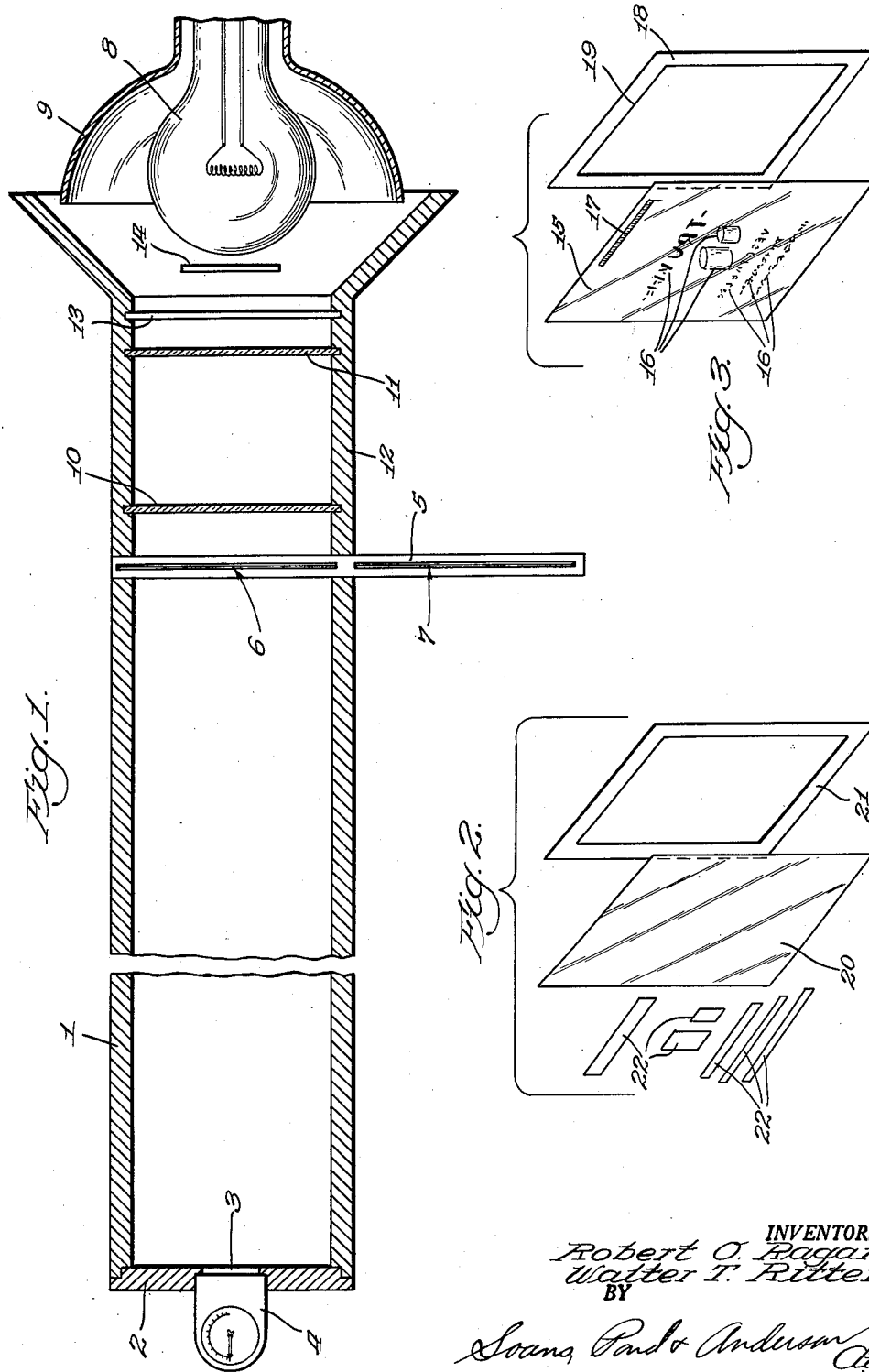
INVENTORS.
Robert O. Ragan
Walter T. Ritter
BY
Soans, Pond & Anderson
Attys.

Patented Mar. 17, 1953

2,631,491

UNITED STATES PATENT OFFICE 2,631,491

METHOD OF MEASURING AREAS, ESPECIALLY IRREGULAR AREAS

Robert O. Ragan, Oak Park, and Walter T. Ritter, River Forest, Ill., assignors to Chicago Carton Company, Chicago, Ill., a corporation of Delaware Application October 17, 1947, Serial No. 780,528

3 Claims. (Cl. 88—14)

This invention relates to an improvement in a method for measuring irregular areas which cannot, as a practical matter, be measured by conventional methods, such as computations based on various linear measurements or other known methods. The present invention has been developed in connection with the measurement of areas printed on cartons or the like, one of the important purposes of the development being that of determining the amount of ink which will be required to print a given job, thereby to facilitate more accurate determination of the cost of the job than has heretofore been practicable.

The invention will hereinafter be explained as applied to the measurement of an irregular printed area, but it should be understood that the invention is applicable to the measurement of other areas which cannot practicably be measured by other known measuring means, and that the following reference to the measurement of printed areas is merely exemplary and not to be construed as a limitation on the scope of the invention as set forth in the appended claims.

In the accompanying drawing there is illustrated more or less schematically a simple form of apparatus which has been found reasonably satisfactory for the practice of the invention.

Fig. 1 shows apparatus for illuminating and measuring transmission of a film.

Fig. 2 shows the association of masking border, clear film and a selection of opaque strips.

Fig. 3 shows the association of masking border and film having representation of subject matter the area of which is to be measured.

The illustrated apparatus consists of a long hollow tube 1, which is closed at one end by means of a closure 2 having a window 3 arranged to permit the positioning of a light meter 4 to measure the light intensity in the tube or tunnel 1 at that end.

At the opposite end of the tunnel 1 there is provided a transversely shiftable film or plate holding slide 5 of approximately the same character as is employed in more or less conventional picture projecting machines. The slide 5 is provided with two holders 6 and 7 which may embody a pair of clear glass plates so mounted in the slide as to be adapted to receive between them certain parts which will presently be referred to and through which a light beam is to be projected.

The source of light 8, here represented as a 1500 watt frosted Mazda lamp bulb, is disposed in back of the film slide 5 within a suitable glass lined or other reflector 9. Well diffused light is desired and to that end frosted glass diffusing plates 10 and 11 are mounted in a portion 12 of the tunnel 1 between the slide member 5 and the source of light. In addition, suitable screens 13 and 14 are provided between the source of light 8 and the adjacent diffusing plate 11 to screen out and to diffuse the intense light usually emanating from the center of the light bulb 8. The screen 14 may constitute an apron of glass cloth located approximately over the center of the frosted bulb 8 and the screen 13 may consist of a pane of clear glass with a large asterisk-like figure made of heavy lines of opaque paint crossing at the center of the glass plate.

The specified details may be widely varied and other light sources may be employed. The important requirements are that there be provided a well diffused beam of light of sufficient intensity after projection through a film positioned in the holder 5 to provide a light value which is readily measurable by means of available foot candle light meters, such as represented by the light meter 4.

The light meter 4 may be any commercial light meter calibrated for measurement of a range of light intensities, such as is encountered in the use of the method and apparatus herein contemplated, such light meters consisting of a photoelectric cell coupled to a microammeter. A meter having a scale reading from 1 to 50-foot candles is generally satisfactory.

Having available apparatus of the character indicated, a black and white photographic film of the subject to be measured is prepared. Such a film is represented at 15 having thereon opaque images indicated at 16, representing reading matter and illustrative matter, the original area of which is to be determined. The film 15 represents a positive but, in some cases especially where the area to be measured is a small proportion of the whole area, it has been found advantageous to use a negative having the required opacity. The photographic film 15 is reduced or enlarged with reference to the original from which it is taken so as to fit the photographic representation within a predetermined area which, for present purposes, may be considered to be an area measuring 7" x 7".

In connection with the preparation of the film 15, a suitable scale of linear measurement is also photographed so as to appear on the film reduced or enlarged in the same proportion that the subject matter is reduced or enlarged, the reproduction of the scale or ruler being represented at 17 and this reproduction being so located as to be on the film but outside of the aforesaid 7" x 7" working area. This film should be prepared so that the printed matter photographed (in a positive) will be represented by surfaces which are opaque to light transmission, and the clear portions of the film within the working area should be as clear and transparent as possible and as free as possible from clouded areas. The reduction or enlargement of the photographed subject should be such that its long dimension will fit within the 7" x 7" area but it is not necessarily an exact fit within such area.

The film 15 prepared as aforesaid, is associated with a mask 18 of opaque material having a nopening 19 therein of the said working area size which, in this instance, is 7" x 7". Said film and mask are placed on one of the holders of the slide 5, for example, the holder 7.

Another film 20 of the same character as the film 15 but free of any opaque areas is associated with another mask 21 which is identical with the mask 18 and pieces of opaque material represented at 22 are distributed over the film 20 in positions approximately similar to the subject material to provide representations of the images 16 on the film 15. A stock of standard pieces 22 of various, known sizes may be provided and the proper selection of pieces to correspond with the images 16 is determined by trial and error. This is accomplished by first projecting a diffused beam of light through the film 15 in the holder 7 and reading the light intensity registered on the light meter 4. Thereafter the film 20 with its associated opaque pieces 22 and mask 21 is placed in the holder 6 of the slide 5 and interposed in the same light beam and the light intensity registered on the meter 4 noted.

Adjustment of the selection of opaque pieces 22 is made until the light intensity reading obtained on the meter 4 in respect of the clear film 20 with said associated pieces 22 is close to the reading obtained in respect of the subject film 15. While extreme accuracy is not required in this respect, it is desirable that the two readings be within 1 to 1½ foot candles of each other. It is also advisable that the successive readings be taken as quickly as possible so as to avoid differences due to fluctuations in the line voltage which serves the light source 8. Obviously if an unvarying intensity light source can be provided, this precaution will not need to be observed.

Having obtained the indicated close readings, the following procedure is employed:

First it is desired to determine the reduction or enlargement factor (RF) representing a reduction or enlargement of the film 15 relative to the original subject. This is obtained by dividing the square of the length of the ruler image on the film ($Sf^2$) by the square of the actual ruler length ($Sr^2$). This formula and an example follow, it being assumed for the purpose of the example that the original ruler dimension is 10 inches and the measurement of the reduced photographic representation thereof is 5.18 inches.

FORMULA (1) $$RF = \frac{Sf^2}{Sr^2}$$

Example $$RF = \frac{10^2}{5.18^2} = 3.727$$

The next or second step is to determine the number of square inches of clear area (CAS) remaining in the film 20, hereinafter referred to as the "standard film," which gave a light reading approximately equal to that obtained in respect of the film 15 which is hereinafter referred to as the "subject film." The opaque pieces 22 employed in connection with the standard film are of known area as is the film itself, so that by subtracting the area of the opaque pieces (OA) from the total area (TAS) in the standard film the remaining clear area (CAS) of the standard film will be determined.

This formula and an example follow, the example being based on a standard film 7" x 7" in size or 49 square inches in area, and 23 square inches of opaque area employed with said film.

FORMULA (2) $$CAS = TAS - OA$$

Example $$CAS = 49 - 23 = 26$$

The third step is to take light transmission readings in respect of both the standard and subject films. To avoid error, it is preferable that a number of foot candle light readings be taken and it is advisable that readings be taken alternately from the two films until several consecutive (preferably three) identical readings are obtained from the respective films. Three identical readings from the respective films may, in view of equipment now available, be considered sufficiently accurate to warrant use in calculations which are to be made. The following is an example of a set of such readings:

*Example*

|  | Observed Reading (ORS) in Foot Candles from Standard Film | Observed Reading (ORSu) in Foot Candles from Subject Film |
| --- | --- | --- |
| 1 | 15 | 14.5 |
| 2 | 15 | 14.8 |
| 3 | 14.75 | 14.5 |
| 4 | 14.75 | 14.5 |
| 5 | 14.75 | 14.5 |

Employing the acceptable reading (ORS) of 14.75 from the standard film as one factor, a corrected or calculated maximum reading (CMS) for the standard film without any opaque area, is determined by multiplying the standard film reading (ORS) by the ratio of the total area (TAS) of the standard film to the clear area (CAS) of the same, is represented in the following formula and example:

FORMULA (3) $$CMS = OSR \times \frac{TAS}{CAS}$$

Example $$CMS = 14.75 \times \frac{49}{26} = 27.80 \ F \cdot C.$$

A light reduction factor (LR) is now determined. This refers to the reduction in foot candles of light transmission effected by the opaque portions of the subject film. It is obtained by subtracting the observed reading (OSuR) obtained from the subject film, from the corrected or calculated maximum (CMS) standard film reading. The light reduction factor formula and example are as follows:

FORMULA (4) $LR = CMS - OSuR$

Example $LR = 27.80 - 14.50 = 13.30$ F. C.

A final required factor is the area per foot candle (AFC) of light transmitted through the clear area (CAS) of the standard film. This is obtained by dividing the clear area of the standard film (CAS) by the observed reading (OSR) obtained from the standard which gives in square inches the clear area of the standard for each foot candle of light observed through said clear area of the standard.

The formula for and example of this step are:

FORMULA (5) $AFC = \dfrac{CAS}{OSR}$

Example $AFC = \dfrac{26}{14.75} = 1.763$ sq. in.

Being possessed with (1) the light reduction factor (LR) of the subject film, (2) the area per foot candle factor (AFC), and (3) the photographic reduction factor (RF), the subject printing area (SUA) may be calculated by multiplying these three factors together as shown in the following formula and example:

FORMULA (6) $SuA = LR \times AFC \times RF$

Example $SuA = 13.30 \times 1.763 \times 3.727 = 87.089$ sq. in.

The accuracy of the described method and apparatus is to some extent dependent upon the observer's ability to accurately read the light meter. In determining the photographic reduction, it is desirable that a magnifying glass be employed in measuring the photographed scale so as to obtain the greatest measurement accuracy possible.

Tests for accuracy of the above described method and apparatus in which the area of known areas were determined by the described method and apparatus resulted in ascertained area of 92.8 square inches where the actual area was 93 square inches and an ascertained area of 75.8 square inches where the actual area was 75 square inches. Other similar accuracy checks have been made with similar results. This indicates that the method and apparatus are repetitively accurate, to within a tolerance of 2%. Also tests have been made of the same subject measured by different operators showing that the results obtained are readily reproducible within an insignificant margin of error.

The foregoing procedure is a practicable one. However, it is subject to modification in respect of equipment and in respect of the specific steps employed. For example, instead of successive and alternate readings of the standard and subject films, simultaneous readings may be taken from the two, a common light source, or two identical light sources being employed. Also when films of dependably fixed or constant transparency are available, permanent predetermined light transmission values may be substituted for the separately measured "standard film" values. Furthermore, the steps of photographically reducing or enlarging the subject is not essential, it being employed in accordance with the described method so as to permit area measurement of various sized subjects with a single piece of simple equipment as described. If the subject to be measured consists of several different color areas, the separate color areas may be measured by the described procedure, it being then necessary to prepare a film or reproduction for such separate color area. Other changes may also be made while employing the principles of the described method and apparatus.

We claim:

1. The method of determining the area of a surface, which consists in the steps of (1) photographically preparing a subject film of the surface reduced or enlarged as required to approximately fit the subject surface into a working area of predetermined size, (2) providing a second film having a working area of the same size as said subject film and by means of contrasting clear and opaque areas of known size, forming on said second film, a representation of said subject surface of approximately the same size as said photographic reproduction thereof, (3) projecting a beam of diffused light through said subject film and measuring the intensity of the light projected through the film to thereby provide factor "OSuR," (4) projecting the same beam of diffused light through said second film and at the same distance from said second film as from said subject film, measuring the intensity of the light passed through said second film, thereby to provide factor "OSR," (5) computing from the factor "OSR" and the known area of the subject representation of said second film and the known working area of said second film, the intensity of light which would have been obtained through said working area of the second film in the absence of the opaque portions thereof, thereby to provide factor "CMS," (6) computing the difference between said factors "CMS" and "OSuR" to determine the value or factor "LR" of light reduction due to the opaque area of said subject film, (7) computing from the known working area and the known area of said representation on said second film, the area of said second film excluding said area of said representation, thereby to provide factor "CAS," (8) computing from said factors "CAS" and "OSR" the area of film represented by each unit of light transmitted therethrough, thereby to provide factor "AFC," and (9) computing the area of said irregular surface as the product of said factors "LR" and "AFC," an appropriate reduction or enlargement factor being also employed to compensate for the reduction or enlargement effected in the aforesaid step (1).

2. The method of determining the cumulative area of a plurality of discrete surface portions distributed in any definite pattern, which comprises the steps of (1) photographically preparing a subject film of said surface portions distributed in said pattern reduced or enlarged as required, to approximately fit said surface portions into a working area of predetermined size, (2) providing a second film having a working area of the same size as said subject film and by means of contrasting clear and opaque areas of known size, forming on said second film a representation of said surface portions of approximately the same size and general pattern as said photographic reproduction thereof, (3) projecting a beam of diffused light through said subject film and measuring the intensity of the light projected through the film to thereby provide a factor "OSuR," (4) projecting the same beam of diffused light through said second film with said representation thereon and at the same distance from said second film as from said subject film, measuring the intensity of the light passed through said second film, thereby to provide a factor "OSR," (5) computing the area of the surface portions from the factors "OSR" and "OSuR," the known working area of said films, and the known areas of the subject representation of said second film, and employing an appropriate reduction or enlargement factor to compensate for the reduction or enlargement effected in the aforesaid step (1).

3. The method of determining the area of a surface, which comprises the steps of (1) photographically preparing a subject film of the surface reduced or enlarged as required to approximately fit the subject surface into a working area of predetermined size, the reduction or enlargement being made substantially proportional in all directions and said subject being represented on said film by contrasting clear and opaque portions each of which are of substantially uniform clarity and opacity throughout their respective areas, (2) including in the film but outside of said working area, a correspondingly reduced or enlarged reproduction of a linear measuring scale, (3) providing a second film having a working area of the same size as said subject film and by means of contrasting clear and opaque areas of known size, forming on said second film, a representation of said subject surface of approximately the same size as said photographic reproduction thereof, (4) projecting a beam of diffused light through said subject film and, measuring the intensity of the light projected through the film to thereby provide a factor "OSuR," (5) projecting the same beam of diffused light through said second film with said representation thereon and at the same distance from said second film as from said subject film, measuring the intensity of the light passed through said second film, thereby to provide factor "OSR," (6) utilizing the measured length of the image of said linear measuring scale and the known actual length of said scale to determine a reduction or enlargement factor "RF" and (7) computing the area of the surface from the factors "OSR," "OSuR," and "RF," the known working area of said films and the subject representation of said second film.

ROBERT O. RAGAN.
WALTER T. RITTER.

REFERENCES CITED

The following references are of record in the file of this patent:

UNITED STATES PATENTS

| Number | Name | Date |
| --- | --- | --- |
| 2,149,958 | Fox | Mar. 7, 1939 |
| 2,179,000 | Tea | Nov. 7, 1939 |